United States Patent
Riviezzo

(10) Patent No.: US 6,817,391 B2
(45) Date of Patent: Nov. 16, 2004

(54) SEALED O-RING CONNECTOR

(75) Inventor: Tony Riviezzo, Twinsburg, OH (US)

(73) Assignee: Moeller Marine Products, Twinsburg, OH (US)

( * ) Notice: Subject to any disclaimer, the term of this patent is extended or adjusted under 35 U.S.C. 154(b) by 0 days.

(21) Appl. No.: 10/693,558

(22) Filed: Oct. 24, 2003

(65) Prior Publication Data

US 2004/0084108 A1 May 6, 2004

Related U.S. Application Data

(60) Provisional application No. 60/420,868, filed on Oct. 24, 2002.

(51) Int. Cl.[7] .............................. B65B 1/04; B65B 3/00; B67C 3/00; F16L 27/00
(52) U.S. Cl. ....................... 141/384; 141/368; 141/383; 285/276
(58) Field of Search ............................ 141/311 R, 325, 141/368, 382–384, 386, 392; 137/587–589; 440/88 R, 88 F; 220/4.14; 280/834; 123/509, 510, 514, 541; 285/276, 305

(56) References Cited

U.S. PATENT DOCUMENTS 3,842,870 A * 10/1974 Burgess ...................... 141/286
4,723,929 A * 2/1988 Parish .......................... 441/39

* cited by examiner

Primary Examiner—Timothy L. Maust
(74) Attorney, Agent, or Firm—Howard & Howard

(57) ABSTRACT

A sealed connector assembly (10) includes an insert (12) having an inner bore (26). A rotatable fitting (14) is supported in the inner bore (26). The rotatable fitting (14) has a fluid passageway (72) extending there through. The rotatable fitting (14) has a second passage (64) that extends transversely to the fluid passageway (72) to define an elbow. When the rotatable fitting (14) is inserted into the inner bore (26), a retaining ring (92) on the rotatable fitting (14) snaps into an inner locking groove (46) in an upper threaded portion (16) of the insert (12) and allows the rotatable fitting (14) to rotate in the insert (12). The retaining ring (92) abuts a lost motion device (38) and is compressed radially inward when the rotatable fitting (14) is moved axially inward. During any rotation or axial movement of the rotatable fitting (14) relative to the insert (12), a seal (90) remains in sealing engagement with the inner bore (26) of the insert (12).

11 Claims, 3 Drawing Sheets

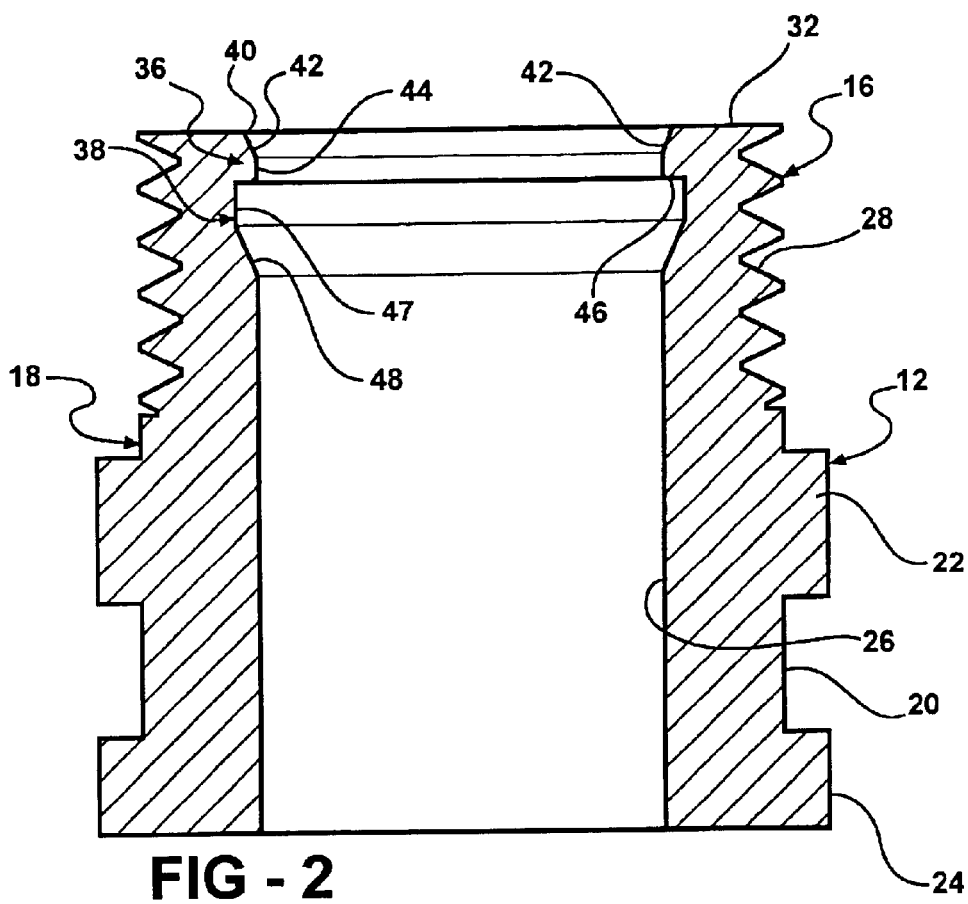
FIG - 2
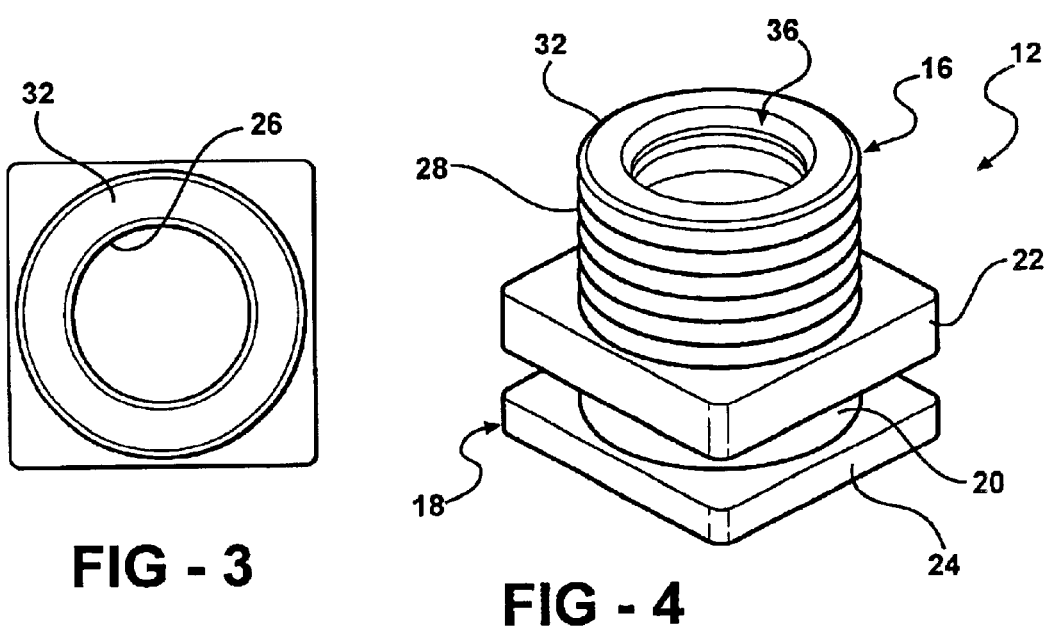
FIG - 3
FIG - 4

SEALED O-RING CONNECTOR

This application claims the benefit of Provisional Application No. 60/420,868, filed Oct. 24, 2002.

FIELD OF THE INVENTION

The present invention relates generally to connectors and, more particularly, to sealed connectors used on fuel tanks in the marine industry.

BACKGROUND OF THE INVENTION

Fuel tanks are generally constructed through various processes. Connector assemblies are assembled into the fuel tanks to allow fluid to flow from a fuel line and pressure to vent into or out of the fuel tanks. In many applications, the connector assemblies are molded into the fuel tanks. The connector assemblies include a first threaded member molded into the fuel tank. A second threaded member is threaded into the first threaded member. The problem with this type of connector assembly is that it is difficult to change the orientation of the second member once it is threaded into the first member. As a result, the connector assembly is not flexible. Thus, there is an opportunity to provide a connector assembly having increased flexibility.

In addition, during the manufacturing process, an operator may inadvertently rotate the first threaded member while adjusting the fuel line. This may loosen the first threaded member and cause a leak at the connector assembly. Further, due to the location of the fuel tank, the connector assembly may be stepped on, which could also damage the connector assembly and cause a leak.

Thus, there is an opportunity to provide a connector that can be rotated 360° and moved axially without affecting the integrity of the connection and that can self-adjust to return the connector to a sealed position when the connector has been moved axially.

SUMMARY OF THE INVENTION

The subject invention provides a sealed connector assembly that includes an insert having an inner bore. The insert is adapted for connection to a source of fluid. A rotatable fitting has a fluid passageway extending there through. The rotatable fitting is supported in the inner bore of the insert. The rotatable fitting has a second passage that extends transversely to the fluid passageway to define an elbow. A lost motion device retains the rotatable fitting in the insert while allowing axial movement of the rotatable fitting in the bore and for biasing the rotatable fitting against such axial movement.

The connector of the present invention can be rotated 360° and moved axially without affecting the integrity of the connection. In addition, the connector has a self-adjusting feature which returns the connector to a sealed position when the connector has been moved axially.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a cross-sectional side view of an insert;

FIG. 3 is a top view of the insert;

FIG. 4 is a perspective view of the insert;

DETAILED DESCRIPTION OF THE PREFERRED EMBODIMENT

Figure 1:
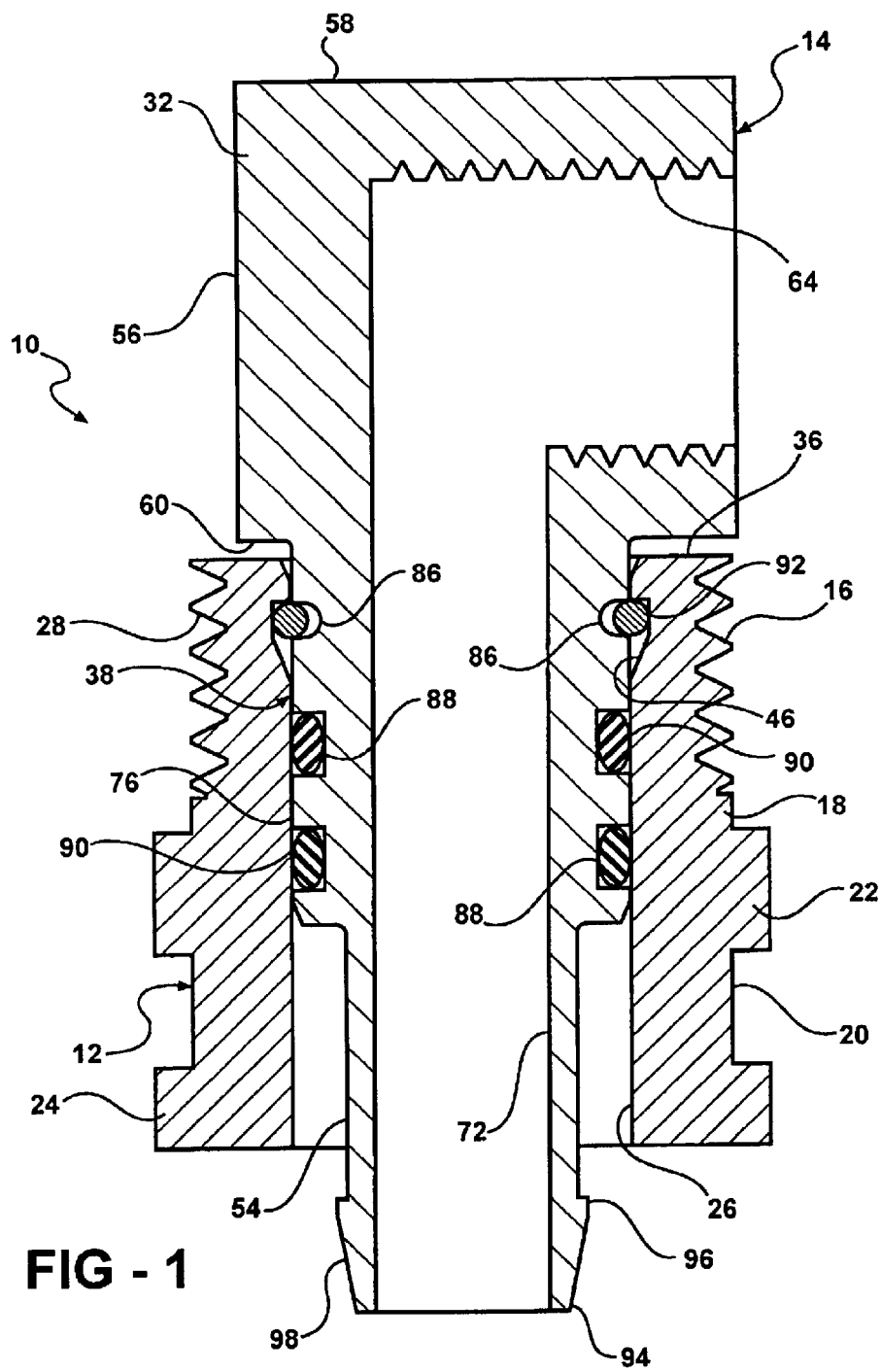
FIG. 1 is a cross-sectional side view of a connector in accordance with the invention.
Figure 9:
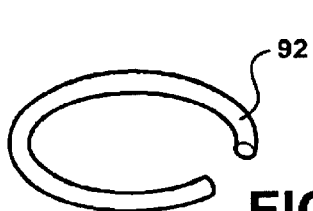
FIG. 9 is a perspective view of a ring.

Referring to the Figures, wherein like numerals indicate like or corresponding parts throughout the several views, a sealed connector assembly is generally shown at 10 in FIG. 1. The sealed connector assembly 10 includes an insert 12. The insert 12 is adapted for connection to a source of fluid, i.e. a fuel tank. It is to be understood that the fluid may be a liquid, a gas. In another embodiment, the insert 12 is connected to the fuel tank as a vent. The insert 12 has an inner bore 26. A rotatable fitting 14 is supported in the inner bore 26. The rotatable fitting 14 has a fluid passageway 72 extending there through. The rotatable fitting 14 has a second passage 64 that includes interior threads and extends transversely to the fluid passageway 72 to define an elbow. The interior threads allow the rotatable fitting 14 to connect a fluid line. The rotatable fitting 14 extends to a distal end 94 that is disposed exteriorly of the insert 12. A conical surface 98 expands from the distal end 94 to a shoulder 96. The distal end 94 connects to the fluid line. The rotatable fitting 14 can also serve as a vent fitting in which case the distal end 94 may be disposed flush with the insert 12. The insert 12 and the rotatable fitting 14 may be made of plastic, aluminum, or any other suitable material.

As best shown in FIGS. 1–4, the insert 12 has threads 28 mounted on an exterior thereof. More specifically, the insert 12 includes an upper threaded portion 16 and a lower locking portion 18. The lower locking portion 18 includes first 22 and second 24 locking flanges that are axially spaced. The locking flanges 22,24 extend annularly about the exterior of the insert 12 and beyond the threaded portion 16.

Referring to FIG. 2, the inner bore 26 includes an entry conical shape 36. The entry conical shape 36 has a trailing edge 40 extending inwardly and downwardly from a top 32 to a lead-in edge 42. The lead-in edge 42 has a smaller radius than that of the trailing edge 40. A waist 44 extends downwardly from the lead-in edge 42 and defines an inner locking groove 46 between the waist 44 and a lost motion device 38. The lost motion device 38 comprises a conical wall 48 that extends axially from a bottom 47 of the inner locking groove 46 toward the inner bore 26. As shown in FIG. 1, the inner locking groove 46 of the upper threaded portion 16 receives a radially contractable retaining ring 92 in locking engagement for rotatably engaging the rotatable fitting 14 in the insert 12. The retaining ring 92 defines a space in a circumference of the retaining ring 92 to allow for contraction against an outward and inherent spring-like bias.

Referring now to FIGS. 1 and 5 through 9, the rotatable fitting 14 further includes an upper portion 52 and a lower portion 54. The upper portion 52 has opposing side walls 56 and a top 58 spaced from a bottom 60. The second passage 64 extends inwardly from one of the side walls 56 to allow for fluid movement through the sealed connector assembly 10. It is to be understood that the connector includes the lost motion device 38 in combination with the retaining ring 92 and the waist 44.

Figure 10:
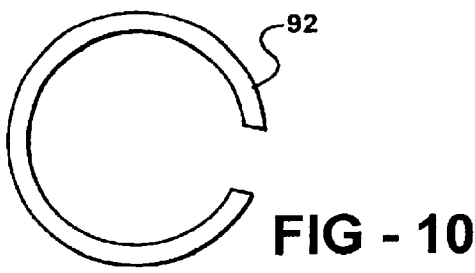
FIG. 10 is a top view of the ring.
Figure 5:
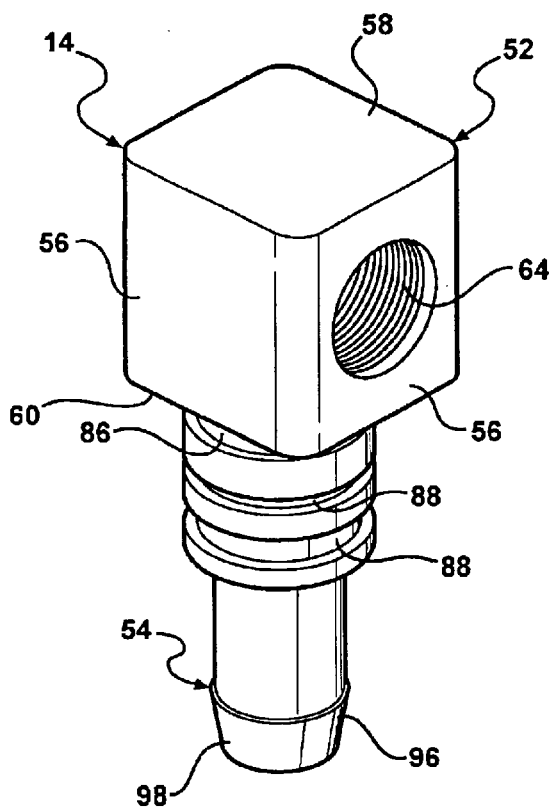
FIG. 5 is a perspective view of a fitting.
Figure 6:
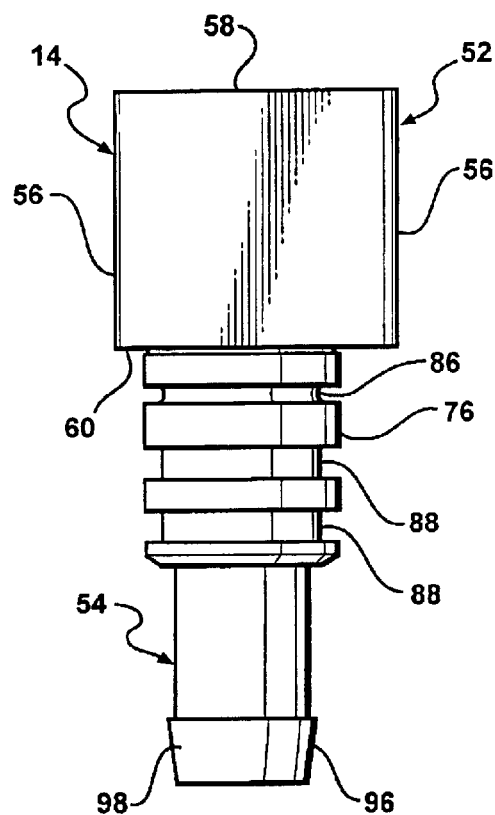
FIG. 6 is a side view of the fitting.
Figure 7:
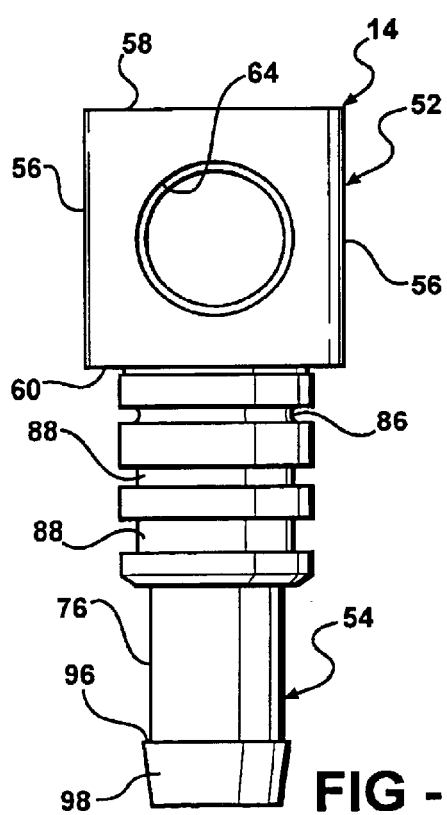
FIG. 7 is a front view of the fitting.
Figure 8:
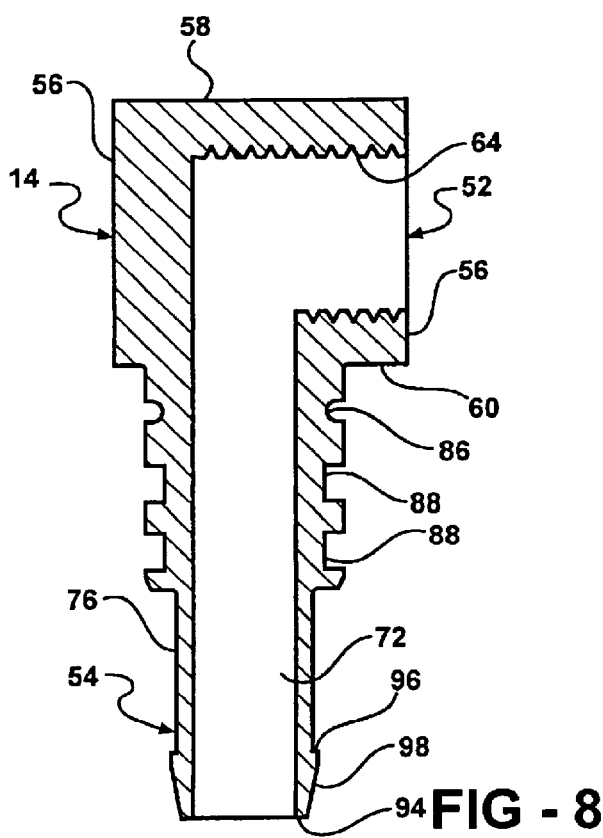
FIG. 8 is a cross-sectional side view of the fitting.

The lower portion 54 has a hollow cylindrical configuration that defines the fluid passageway 72 extending along an axis. The lower portion 54 also has an outer surface 76 presenting a locking channel 86 and a plurality of grooves 88. The retaining ring 92, shown in FIGS. 1, 10, and 11, is disposed in the locking channel 86.

The waist 44 interacts with the retaining ring 92 to hold the insert 12 and the rotatable fitting 14 in proper alignment and allow the rotatable fitting 14 to rotate within the insert 12. The retaining ring 92 passes the waist 44 and snaps into the inner locking groove 46. When disposed in the inner locking groove 46, the retaining ring 92 exerts force outwardly on the bottom 47. The entry conical shape 36 functioning in connection with the lost motion device 38 affects the contracting of the retaining ring 92. In operation, as the rotatable fitting 14 is inserted into the inner bore 26 and moves axially, the retaining ring 92 abuts the entry conical shape 36 and the lost motion device 38 and compresses radially inward. During any rotation of the rotatable fitting 14 relative to the insert 12, a seal 90 such as an O-ring or any other suitable seal remains in sealing engagement with the inner bore 26 of the insert 12.

As shown in FIG. 1, the seals 90 are disposed in each of the plurality of grooves 88 for sealing with the insert 12 and preventing leaks of fuel or fumes. In particular, the seals 90 are compressed between the grooves 88 and the inner bore 26 to maintain sealing engagement between the rotatable fitting 14 and the insert 12.

If an external force is exerted downwardly on the sealed connector assembly 10, the rotatable fitting 14 would be pushed downward. The retaining ring 92 would then engage the conical wall 48 of the lost motion device 38 and abut the entry conical shape 36 and be compressed radially inward. The seals 90 would remain in sealing engagement between the grooves 88 and the inner bore 26. When the external force is discontinued, the retaining ring 92 would bias outwardly and guide the rotatable fitting 14 upward until the retaining ring 92 re-engages the inner locking groove 46.

It should be understood that the present invention is disclosed in a typical marine type application with reference to a plastic fuel tank. The foregoing detailed description shows the preferred embodiments of the present invention are well suited to fulfill the objectives of the invention. It is recognized that those skilled in the art may make various modifications or additions to the preferred embodiments chosen herein to illustrate the present invention, without departing from the spirit of the present invention such as using the connector of the present invention on other applications within and outside of the marine industry and with materials other than plastic. Therefore, it is to be understood that the invention may be practiced otherwise than as specifically described.

What is claimed is:

1. A sealed connector assembly comprising;
an insert (12) having an inner bore (26) and adapted for connection to a source of fluid, a rotatable fitting (14) having a fluid passageway (72) extending there through and supported in said inner bore (26) of said insert, said rotatable fitting (14) having a second passage (64) extending transversely to said first fluid passageway (72) to define an elbow, and a lost motion device (38) for retaining said rotatable fitting (14) in said insert while allowing axial movement of said rotatable fitting (14) in said bore (26) and for biasing (92) said rotatable fitting (14) against said axial movement.

2. A sealed connector assembly comprising:
an insert (12) having an inner bore (26) and adapted for connection to a source of fluid, a rotatable fitting (14) having a fluid passageway (72) extending there through and supported in said inner bore (26) of said insert, said rotatable fitting (14) having a second passage (64) extending transversely to said first fluid passageway (72) to define an elbow, a locking channel (86) extending about said rotatable fitting (14), an inner locking groove (46) extending about said bore (26) of said insert (12), and a retaining ring (92) disposed in said channel (86) and in said inner locking groove (46) for rotatably retaining said rotatable fitting (14) in said bore (26) of said insert (12).

3. An assembly as set forth in claim 2 wherein said retaining ring (92) is radially contractable and a conical wall (48) extends axially from the bottom (47) of said groove (46) toward said bore (26) for compressing said retaining ring (92) radially inwardly during axial movement of said rotatable fitting (14) into said bore (26) of said insert (12).

4. An assembly as set forth in claim 3 including at least one seal (90) disposed about said rotatable fitting (14) in said bore (26) of said insert (12).

5. An assembly as set forth in claim 3 wherein said bore (26) includes an entry conical shape (36) for contracting said retaining ring (92) during entry into said bore (26) with said rotatable fitting (14).

6. An assembly as set forth in claim 5 including a waist (44) disposed between said entry conical shape (36) and said groove (46) in said bore (26).

7. An assembly as set forth in claim 5 wherein said insert (12) includes threads (28) on the exterior thereof.

8. As assembly as set forth in claim 3 wherein said insert (12) includes axially spaced (20) locking flanges (22,24) extending annularly about the exterior thereof.

9. An assembly as set forth in claim 3 including internal threads on the interior of said second passage (64) in said rotatable fitting (14).

10. An assembly as set forth in claim 3 wherein said rotatable fitting (14) extends to a distal end (94) disposed exteriorly of said insert (12).

11. An assembly as set forth in claim 10 wherein said distal end (94) includes a shoulder (96) and a conical surface (98) for connection to a fluid line.

* * * * *